INVENTOR.
CORNELIS VAN DER LELY

Nov. 18, 1969   C. VAN DER LELY   3,478,499
COMBINE HARVESTER
Filed June 1, 1965   6 Sheets-Sheet 3
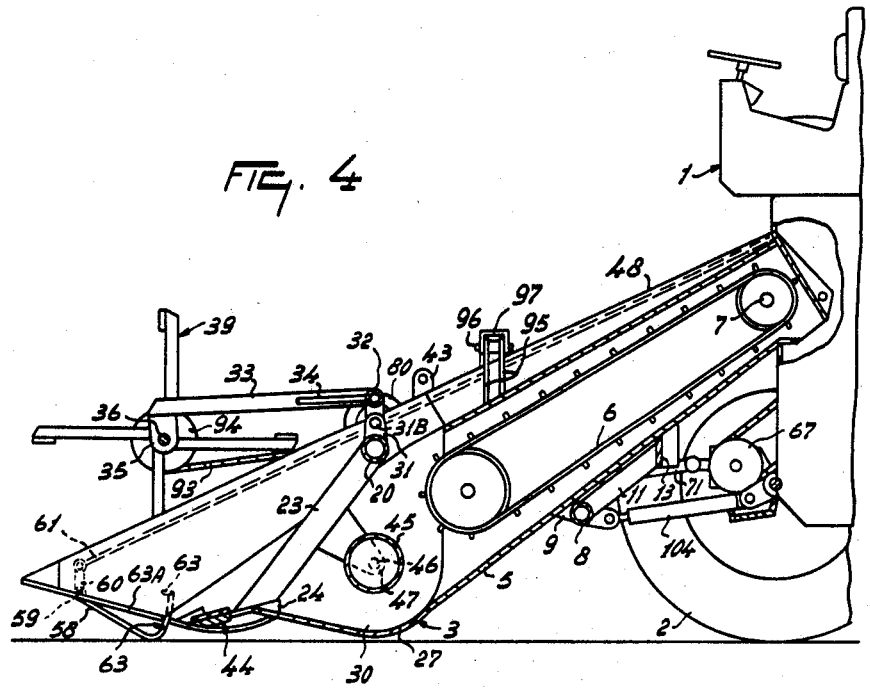
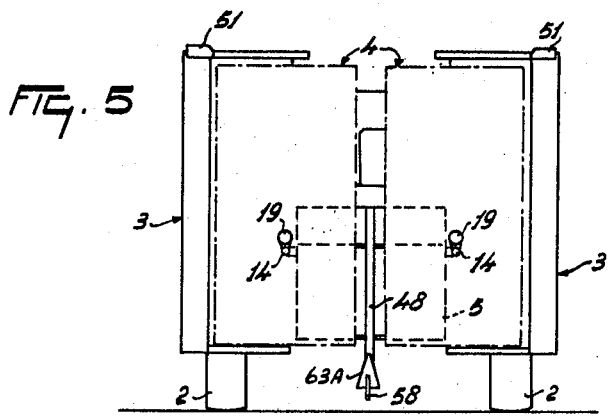
INVENTOR.
CORNELIS VAN DER LELY
BY
Mason, Mason & Albright
Attorneys Nov. 18, 1969  C. VAN DER LELY  3,478,499
COMBINE HARVESTER
Filed June 1, 1965  6 Sheets-Sheet 4
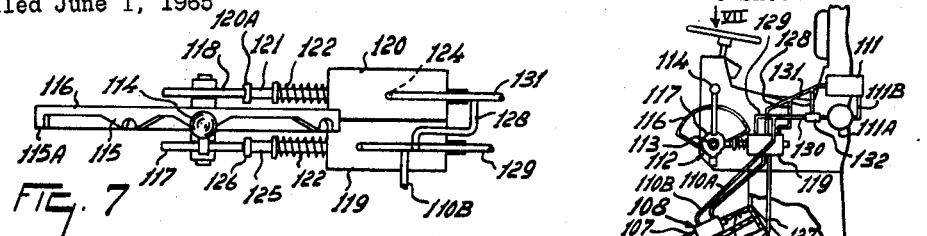
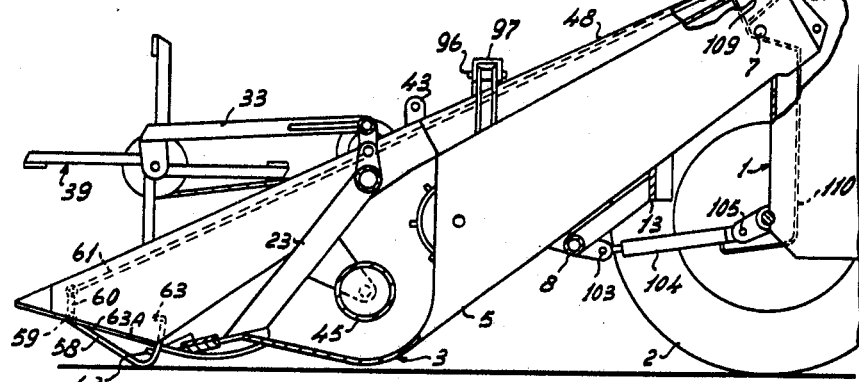
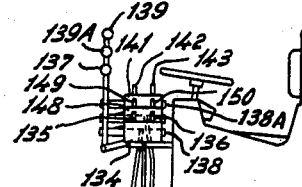
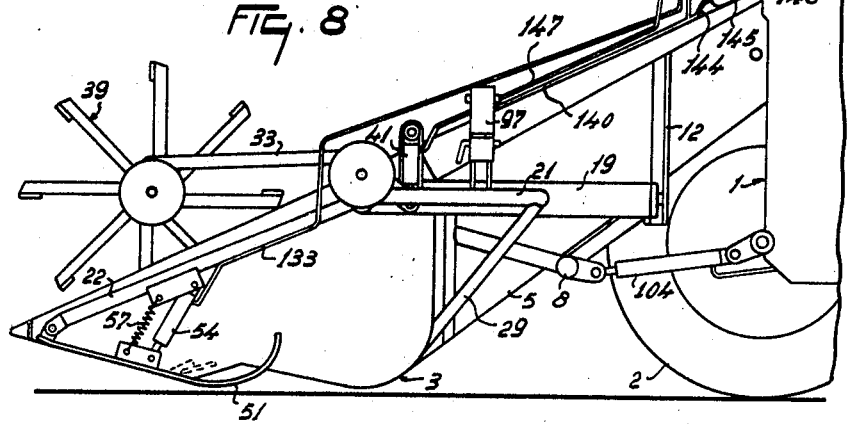
INVENTOR.
CORNELIS VAN DER LELY
BY
Mason, Mason & Albright
Attorneys

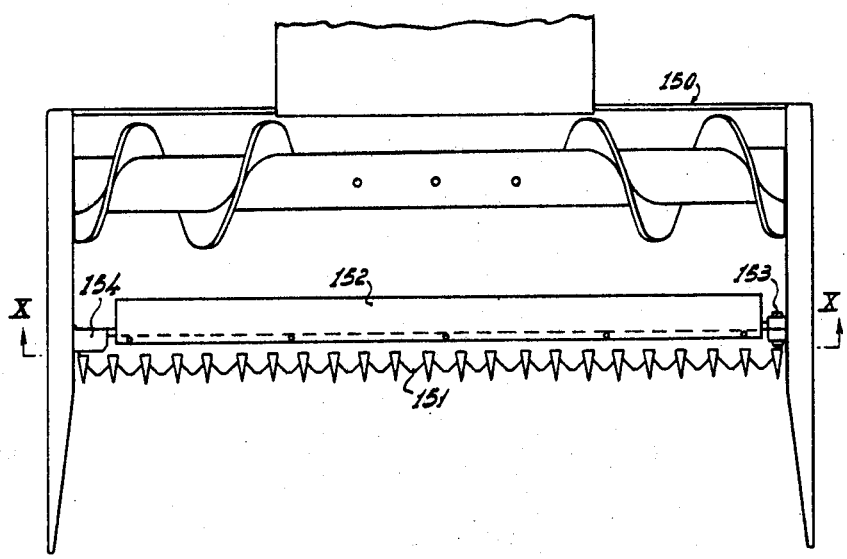
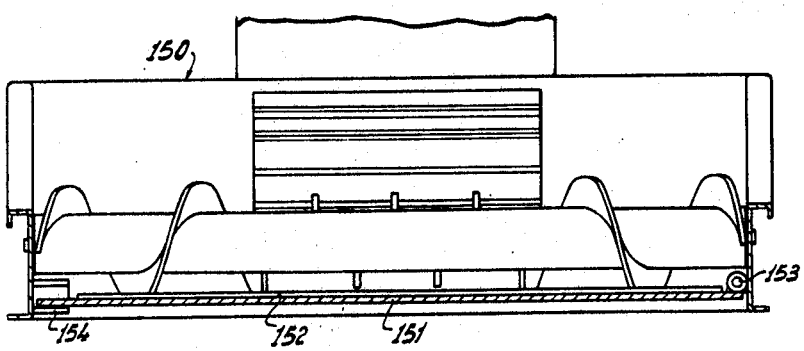

United States Patent Office 3,478,499
Patented Nov. 18, 1969

3,478,499
COMBINE HARVESTER
Cornelis van der Lely, Zug, Switzerland, assignor to Texas Industries Inc., Curacao, Netherlands Antilles, a limited-liability company
Filed June 1, 1965, Ser. No. 460,130
Claims priority, application Netherlands, June 3, 1964, 6406213
The portion of the term of the patent subsequent to Oct. 10, 1984, has been disclaimed
Int. Cl. A01d 41/02, 75/22
U.S. Cl. 56—23                                                20 Claims

ABSTRACT OF THE DISCLOSURE

A combine harvester with two mowing portions each including a reel and auger, a forwardly extending partition between the portions and an elevator housing for receiving cut crop from the portions located to the rear, the portions with their reels being foldable together relative to the elevator housing about pivots having horizontal axes extending longitudinally of the harvester. When so folded, the mowing portions have a width which is substantially the same as the vehicle. A hydraulic circuit is included in the harvester for supporting the portions, such circuit including hydraulic cylinders which in cooperation with ground feelers maintain the mowing portions at a desired height above the underlying ground or alternatively in a set position relative to the other components of the harvester. The hydraulic circuit includes gas under pressure communicating with the hydraulic cylinders which support the mowing portions whereby the support rendered is of a resilient type.

---

This invention relates to a combine harvester, comprising a mowing mechanism.

In accordance with the invention there is provided a harvesting machine of the kind set forth, wherein the mowing mechanism transverse to the intended direction of travel is flexible in upward direction so as to match the unevennesses of the ground in operation.

Figure 1:
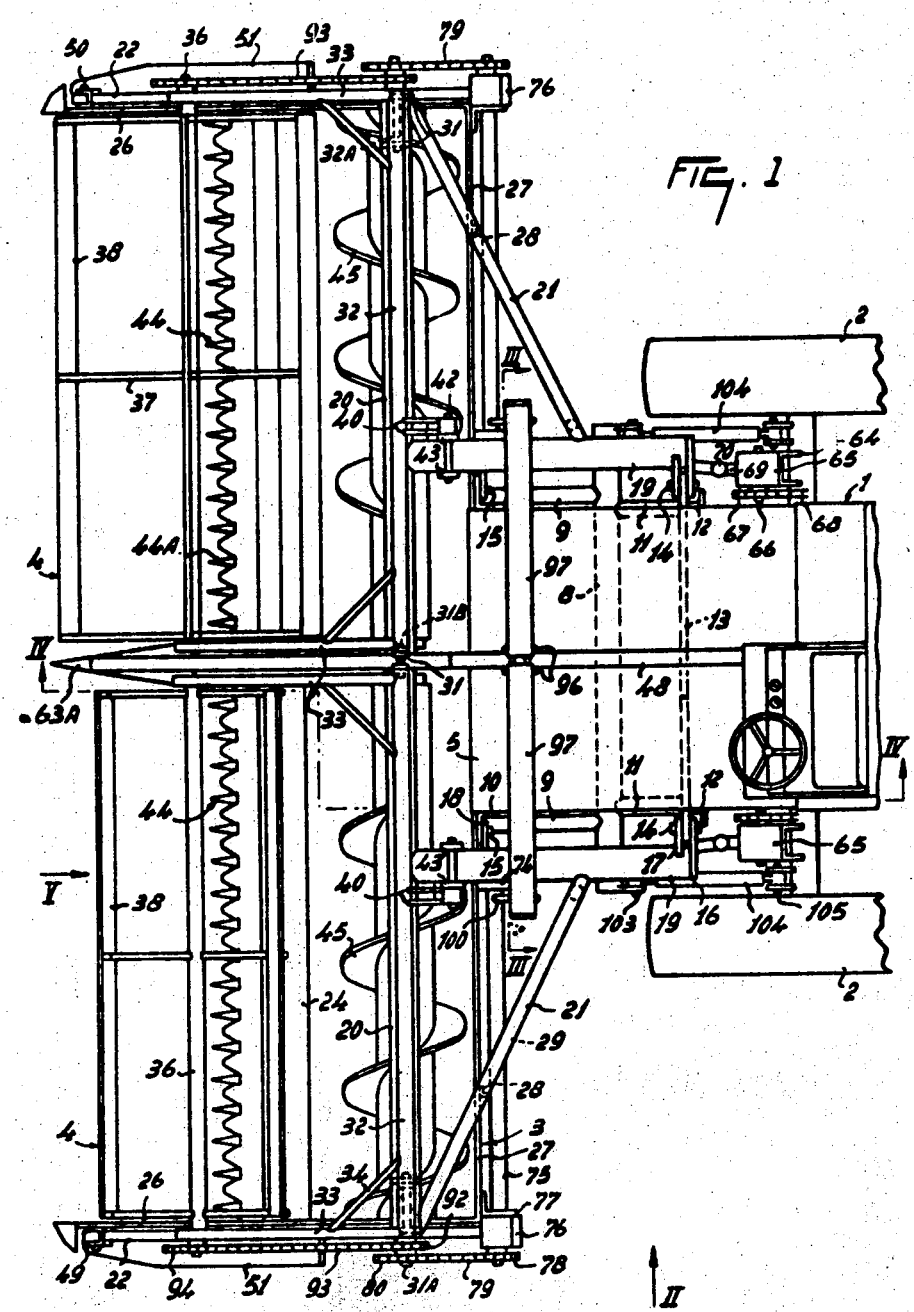
Figure 2:
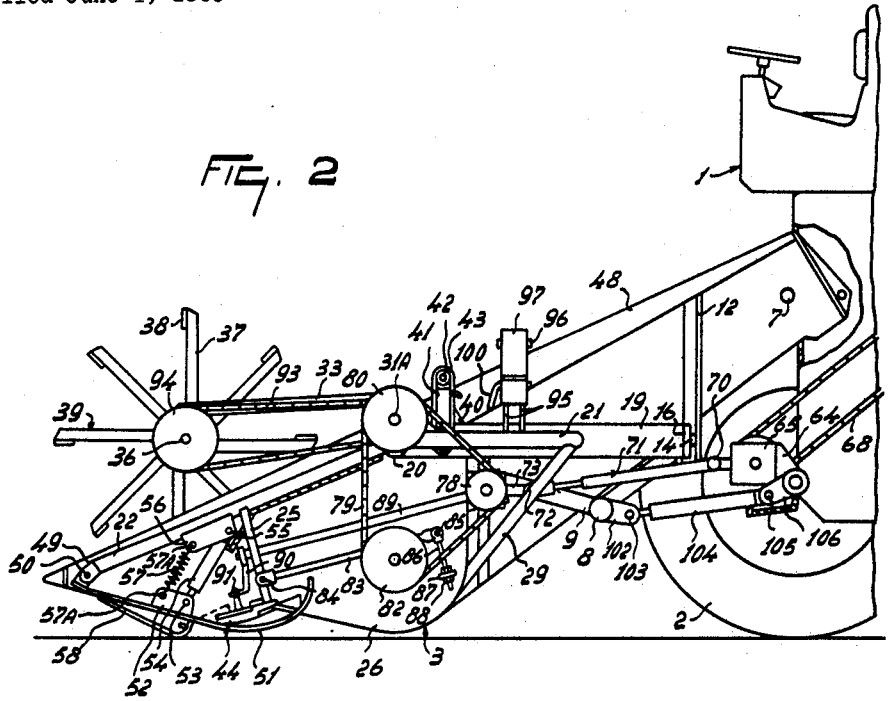
Figure 3:
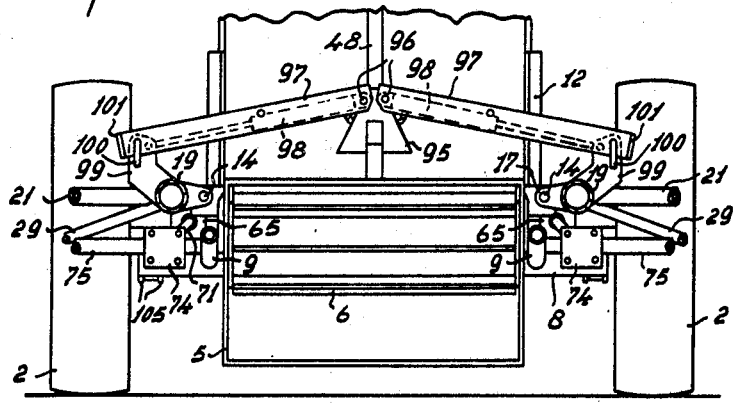
Figure 11:
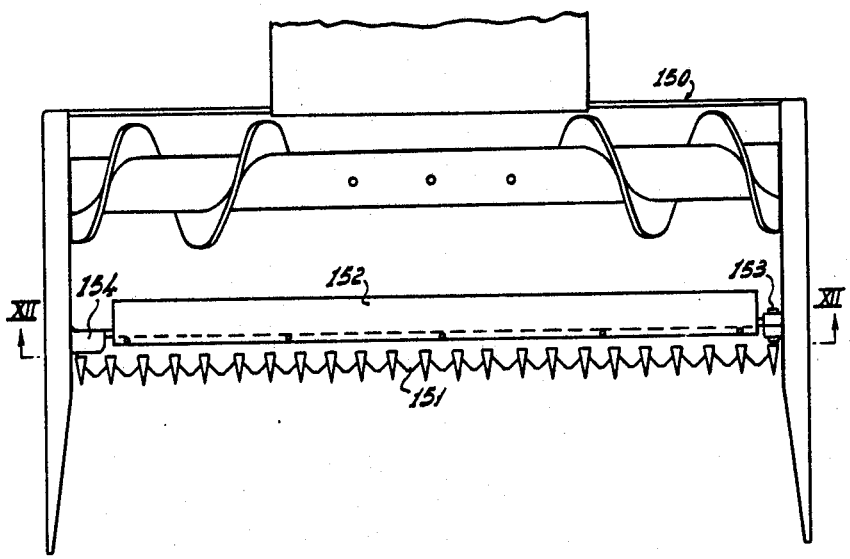
Figure 12:
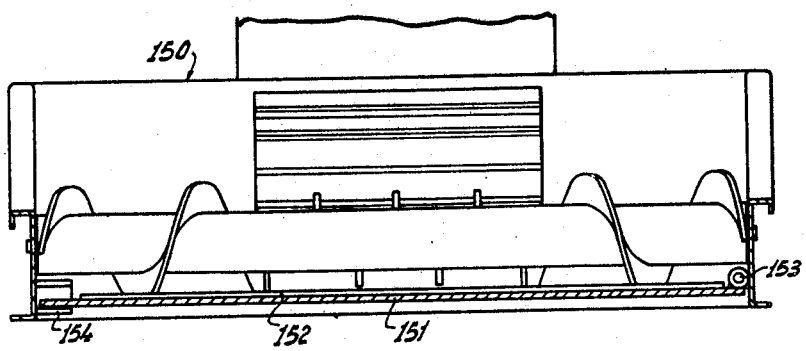

For a better understanding of the invention and to show how the same may be readily carried into effect, reference will now be made, by way of example, to the accompanying drawings in which:

FIGURE 1 is a plan view of a forward portion of a second embodiment of combine harvester, FIGURE 2 is a view taken in the direction of the arrow II in FIGURE 1, FIGURE 3 is a sectional view taken on the line III—III in FIGURE 1, FIGURE 4 is a sectional view taken on the line IV—IV in FIGURE 1, FIGURE 5 is a diagrammatic front view of the second embodiment of combine harvester in a transport position, FIGURE 6 is a diagrammatic view of part of the hydraulic circuit including a regulating mechanism and control members for adjusting the position of the mowing mechanism, FIGURE 7 is a fragmentary view, to an enlarged scale, taken in the direction of the arrow VII in FIGURE 6, and FIGURE 8 is a diagrammatic view of the hydraulic control of a support for the mowing mechanism and the hydraulic vertical adjustments of the reel, FIGURE 9 is a plan view of an embodiment, whereby the mowing mechanism comprises a flexible mounted cutter bar, FIGURE 10 is a sectional view taken on the line X—X in FIGURE 9.

The harvesting machine shown in the FIGURES 1 to 8 comprises a combine harvester, the cutting and elevating portions of which are arranged on the front side of a ground wheel supported frame. However, only the ground wheels 2 are shown. The cutting mechanism comprises a mowing table 3 which has two portions 4 lying alongside each other and each connected to a generally cylindrical elevator housing 5. The housing 5 is pivotally connected to the portions 4 and extends upwardly and rearwardly therefrom. The housing 5 is made from sheets of material and forms a central elevator for cut or mown crop. Near the mowing table 3 the housing 5 has an opening communicating with an outlet opening formed in the rear wall of the mowing table 3. The housing 5 tapers rearwardly and thus the inlet diameter is greater than the diameter of the outlet which opens to threshing and cleaning parts of the harvester. The housing 5 encloses an endless conveyor chain 6. The mowing table 3 and the elevator housing 5 are both turnable about a shaft 7 arranged at the upper end of the housing 5 and extending perpendicular to the intended direction of travel. The shaft 7 also constitutes a support for the upper end of the elevator chain 6. A beam 8 is mounted on the underside of the housing 5, is located at a given distance from the forward opening of the housing 5 and extends perpendicular to the intended direction of travel and on either side of the housing 5 and for a given distance beyond same (FIGURE 1).

Beams 9 are connected to the base 8 and extend forwardly therefrom alongside the outer walls of the elevator housing 5. The forward ends of the beams 9 are secured to angle beams 10 which extend vertically near the forward opening of the elevator housing 5. Upwardly and rearwardly extening beams 11 are also secured to the beam 8 and are disposed substantially parallel to the bottom of the housing 5 approximately beneath the upright side walls thereof. The beams 11 are connected to angle beams 12 through a strip 13 which extends parallel to the beam 8, the angle beams 12 extending vertically one on either side of the elevator housing 5.

The strip 13 carries pins 14, one on either side of the elevator housing 5. The angle beams 10 each carry a pin 15, each of which pins 15 is located forwardly of a corresponding pin 14 and has its axis coincident therewith. Strips 16 and 17 which extend perpendicular to the intended direction of travel are pivotally mounted on the pins 14 and a similarly extending strip 18 is mounted on each pin 15. Each group of strips 16, 17 and 18 on either side of the elevator housing 5 is connected to a corresponding beam 19 which extends in the intended direction of travel and parallel to the elevator housing 5. The forward ends of both the beams 19 are connected to a framed structure 20 which extends perpendicular to the intended direction of travel. The structure 20 comprises aligned beams extending over a distance equal to the width of each portion 4 of the mowing table 3. A beam 21 extends between the outermost end of one of the beams 20 and its corresponding beam 19. The beams 21 are connected to their corresponding beams 19 at the same level as the strips 18. Thus, as can be seen from FIGURE 1, a triangular supporting frame for each portion 4 of the mowing table 3 is provided.

The beams of the structure 20 for each portion 4 are thus turnably mounted on corresponding pins 14 and 15 which extend in the intended direction of travel through corresponding beams 19. Beams 22 are mounted on the outermost ends of the beams 20, said beams 22 extending forwardly and downwardly therefrom. The adjacent inner ends of the beams 20 are provided with supporting beams 23 which extend forwardly and downwardly therefrom in the intended direction of travel (FIGURE 4).

The supporting beams 23 each carry a corresponding horizontal beam 24 near their lower sides, each of which beams 24 extend perpendicular to the intended direction of travel and is connected at its outer end with an angle beam 25 which extends substantially vertically and is connected to the beams 22. Each beam 22 carries a vertical plate 26 which constitutes one of the outer sides of the mowing table 3. The beams 22 and 25 are located on the outer side of their corresponding plates 26 (FIGURE 2). A base plate 27 is arranged on the beam 24 and extends rearwardly therefrom in a substantially horizontal direction and merges into an upwardly bent portion. Each portion 4 of the mowing table 3 has corresponding a beam 24 and base plates 27. The plate 27 forms the base and the rear wall of its corresponding portion 4 and has its upper side bent over at right angles and coupled with an angle beam 28 which extends downwardly away from a corresponding beam 21. The lower end of each angle beam 28 is coupled with a corresponding beam 21 through an upwardly and rearwardly extending beam 29. The beam 29 is connected to its corresponding beam 21 near the point where the beam 21 is connected to its corresponding beam 19. Each plate 27 is secured to a corresponding plate 26 forming one of the outer walls of the mowing table 3 and the bent over portion of each plate 27 is prolonged to meet a side wall of the elevator housing 5. The supporting beams 23 which are arranged near the adjacent ends of the structure 20, carry vertical plates 30 which constitute the inner walls of the portions 4 of the mowing table 3, the plates 30 being secured at their lower edges to the horizontal portions of the plates 27. The ends of the frame beams 20 carry lugs 31 which are formed with holes and receive shafts 31A and 31B. The shafts 31A and 31B extend parallel to the frame beams 20 and are surrounded by lugs 32A which are secured near the ends of beams 32 also parallel to the beams 20. The beams 32 are provided near their outer ends with beams 33 which extend perpendicular thereto and in the direction of travel. The junctions between the beams 32 and 33 are stiffened by means of supports 34.

The beams 33 carry bearings 35 near their free forward ends, said bearings 35 receiving shafts 36 which extend perpendicular to the intended direction of travel and parallel to the beams 32. The shafts 36 carry radial supports 37 near their ends and also between same and struts 38 extend between the tips of the supports 37. The struts 38 may, if desired, carry tines. The supports 37 and struts 38 constitute reels 39 located above the portions 4 of the mowing table 3. The beams 32 carry pairs of lugs 40 near their corresponding beams 19, said lugs 40 extending downwardly and rearwardly from the beams 32. Each pair of lugs 40 is pivotally connected to a corresponding substantially vertically disposed lifting cylinder 41 which is located on the side of the beam 32 remote from its corresponding reel 39. The end of each cylinder 41 remote from its corresponding pair of lugs 40 is pivotally connected to the corresponding beam 19 by means of a pin 42. Each pin 42 is supported between two strips 43 which are mounted on the upper side of the corresponding beam 19 and are spaced apart from each other.

The horizontal beams 24 which extend perpendicular to the intended direction of travel and are located on the lower side of the mowing table 3 carry at their forward ends finger bars 44A forming part of cutter bars 44. Each portion 4 of the mowing table 3 is similarly constructed and accordingly will only be described in respect of one of them. An auger 45 is mounted on a shaft 46 which extends perpendicular to the intended direction of travel and is rotatably mounted in a bearing 47 arranged on the supporting beam 23 and in a bearing (not shown) arranged on the plate 26 which constitutes one of the outer walls of the mowing table 3.

A partition 48 is mounted on the upper side of the elevator housing 5 and at the center thereof, said partition 48 diverging forwardly (FIGURES 2 and 4). Referring to FIGURE 1, it will be evident that the partition 48 at its front end constitutes a crop divider. However, the partition 48 also constitutes a partition between the two portions 4 of the mowing table 3, said partition being located near the center of the combine harvester.

The front ends of the beams 22 carry forks 49, which forks 49 carry shoes 51 on pins 50 arranged between the limbs of the forks. The shoes 51 extend rearwardly from the forks 49 and comprise supporting members whose free rearmost ends are bent upwardly (FIGURE 2). Approximately mid-way between its ends, each shoe 51 carries a plate 52 on its upper side and a corresponding lifting cylinder 54 is pivotally connected to each plate 52 by means of a pin 53. The other ends of the cylinders 54 are pivotally connected to plates 56 mounted on the lower sides of the beams 22 by means of pins 55. Tension springs 57 extend between the plates 52 and 56, are parallel to the lifting cylinders 54 and are connected forwardly of the lifting cylinders. The connections between the springs 57 and the plates 56 are afforded by means of pins 57A. A feeler member 58 is secured to a pivot pin 59 which is mounted to the forward end of the partition 48, the feeler member 58 extending rearwardly of the pin 59 which has an upright arm 60 secured thereto.

The arm 60 is pivotally connected to a rod 61 which has its rearmost end connected to a control valve mounted on the frame of the combine harvester (FIGURE 6). The construction and operation of the hydraulic circuit of the combine harvester will be more fully described later. The free rearmost end of the feeler member 58 is bent upwardly, said free end being provided with spaced stops 63 which can co-operate with a stop formed by a part 63A of the partition 48. The part 63A serves to limit the up and down movement of the feeler member 58. The working mechanisms associated with each portion 4 of the mowing table 3, that is the cutter bar 44, the auger 45 and the reel 39, are adapted to be drive individually by means of a gear box 65 mounted on the axle of the ground wheels 2 through supports 64. (FIGURE 1). Each gear box 65 receives a shaft 66 extending perpendicular to the intended direction of travel and sprockets 67 are mounted on both said shafts 66 on the outer side of the gear boxes 65. Chains 68 drivingly connect the sprockets 67 with sprockets which are driven by the engine of the combine harvester. Each shaft 66 inside its corresponding gear box 65 carries a bevel gear (not shown) which is in meshing engagement with a bevel gar (not shown) mounted on a shaft 69 which extends in the traveling direction and is coupled through a universal joint 70 with a telescopic intermediate shaft 71. The end of each shaft 71 remote from its corresponding universal joint 70 is linked to a shaft 73 through a universal joint 72, the joint 73 being provided with a bevel gear (not shown) in a gear box 74 mounted on the vertical plate 26 which forms the rear wall of the corresponding portion 4.

The bevel gear in each gear box 74 is adapted to cooperate with a bevel gear (not shown) secured to the shaft 75 which extends perpendicular to the intended direction of travel and on the rear of the corresponding portion 4, and the outer end of the shaft 75 is received in a gear box 76. Both the gear boxes 76 are secured to their corresponding portions 4 at the level of the adjacent end of one of the beams 20 by means of supports 77. Each shaft projects outwardly beyond its gear box 76 and carries a sprocket 78 on the projecting end, each of which sprockets 78 is linked to a sprocket 80 mounted on a corresponding shaft 31A by a chain 79. Each sprocket 80 is linked to a sprocket 82 mounted on the corresponding shaft 46 for one of the augers 45 (FIGURE 2).

Each of the bearings (not shown) which is mounted in a corresponding plate 26 for supporting the corresponding shaft 46 of an auger 45 is so arranged that it can be displaced with respect to its plate 26 in order to tension the chain 79 and also to adjust the position of the auger 45. To this end each bearing is coupled with a rod 83 which has its forward end pivotally connected to one of the beams 25 by means of a pin 84, which beam 25 is arranged between the beams 22 and 24 and is located along the side of the plate 26. The rearmost end of each rod is pivotally connected to an upright rod 86 by means of a pin 85, the rod 86 being slidably arranged in a support 87 secured to the corresponding plate 26. The lower free ends of the rods 86 are screwthreaded and nuts 88 are screwed onto said ends. Each shaft 46 can be displaced by turning one of the nuts 88 which causes the corresponding rod 86 to move upwardly or downwardly relative to its support 87 thereby also displacing the rod 83 and hence the shaft 46 so that the tension in the chain 79 can be varied and the position of the auger 45 altered.

Each gear box 76 receives a driving shaft 89 which extends forwardly and gently downwardly therefrom. The forward end of each shaft 89 has an angle lever 90 pivotally and eccentrically coupled thereto, which lever 90 is coupled with the sickle bar of the coresponding cutter bar 44 through a ball and socket joint 91. Each shaft 31A also carries a sprocket 92 which is linked to a sprocket 94 mounted on the shaft 36 on the corresponding reel 39 through a chain 93.

Referring to FIG. 1 it will be evident that the drive mechanism for the cutter bars, reels and augers are arranged on the outer sides of the mowing table. Thus the space between the portions 4 can be a minimum distance while works and other adjustments can still be effected. A triangular support 95 is secured to the partition 48, said support extending perpendicular to the intended direction of travel (FIGURE 3). The support 95 carries two pivot pins 96 which are mounted near its uppermost end and each pin 96 is connected to a corresponding channel beam 97 which extends outwardly therefrom in a direction perpendicular to the intended direction of travel. The pins 96 are entered through holes formed in the parallel limbs of the channels and the webs thereof are disposed uppermost. Each beam 97 receives a lifting cylinder 98 which has one end pivotally connected to one of the pins 96 and its other end pivotally connected to an angle arm 99. Each arm 99 is secured to a corresponding beam 19. Operation of one of the cylinders 98 causes the portion 4 concerned to turn upwardly or downwardly about its corresponding pins 14 and 15 which are arranged on its side of the elevator housing 5.

When the portions 4 are turned upwardly about the pins 14 and 15, they occupy the positions shown in FIGURE 5 in which they are substantially vertically disposed. In order to fix the portions 4 in this position, pins 100 are entered through aligned holes formed in the arms 99 and the beams 97. However, the portions 4 can also be locked in a substantially horizontal setting by entering the pins 100 through other aligned holes in the arms 99 and the beams 97. Referring to FIGURE 3 it will be evident that the channel beams 97 have their outer ends closed by plates 101 which constitute stops for the arms 99 when in an unlocked state and hence further downward movement of the portions 4 about the pins 14 and 15 is prevented.

The beam 8 which extends perpendicularly to the intended direction of travel and is located beneath the elevator housing 5, carries pairs of lugs 102, one pair of lugs being located on each opposite side of the housing 5. Hydraulic cylinders 104 are pivotally mounted between the pairs of lugs 102 by means of pins 103 and the other ends of the cylinders 104 are pivotally connected by pins 105 between pairs of lugs 106 fixed to the axles of the ground wheels 2 (FIGURES 2 and 4). The elevator housing 5 together with the mowing table 3 can both be raised and lowered by the hydraulic cylinders 104 which are disposed parallel to each other.

The operation of the various hydraulic systems will now be described more fully with reference to FIGURES 6 to 8. As previously described the feeler member 58 is linked to a rod 61 which extends upwardly and parallel to the longitudinal axis of the partition 48. The rearmost end of the rod 61 is pivotally connected to a sliding rod 107 received in a valve 108 which is mounted on the upper side of the elevator housing 5. The end of the sliding rod 107 remote from the rod 61 is coupled to the frame of the combine harvester by means of a tension spring 109. The valve 108 communicates with both the cylinders 104 by way of pipes 110.

In addition the valve 108 communicates with a reservoir 111 and pump 111A by way of pipes 110A and 110B respectively. The reservoir 111 and and pump 111A form part of the hydraulic circuit provided on the combine harvester and are connected to each other by a pipe 111B. An adjusting mechanism generally indicated by the reference numeral 112 is mounted near the driver's seat on the combine harvester, the mechanism comprising a lever 114 turnably mounted on a pin 113 and movable into various angular settings indicated by elements 115 and 115A on a sector plate 116 (FIGURE 7). Two adjacent cam discs 117 and 118 are mounted on the pin 113 and are adapted to co-operate with a valve 119 identical to the valve 108 and a control valve 120 respectively.

The normal positions of the cam discs 117 and 118 and of the valves 119 and 120 are as shown in FIGURE 7. The cam 118 is formed with a recess which accommodates a roller 120A mounted on the end of a sliding rod 121 received in the control valve 120. A spring 122 surrounds the sliding rod 121 and bears between an end of the housing of the valve 120 and a stop mounted on the sliding rod 121. The spring 122 serves to hold the roller 120A in engagement with the recess formed in the cam 118. The control valve 120 communicates with the valve 108 through the pipe 110A and with the reservoir 111 through a pipe 124.

The cam disc 117 in similar manner co-operates with a roller 126 provided on one end of a sliding rod 125 received in the valve 119. Also a spring 122 bears between the housing of the valve 119 and a stop mounted on the sliding rod 125 and serves to hold the roller 116 in engagement with the recess in the cam 117. The valve 119 communicates with the hydraulic cylinders 104 through pipes 127 and communicates with the reservoir 111 and the pump 111A by way of pipes 128 and 129 respectively. Referring to FIGURE 6 it will be seen that a high pressure main pipe 130 of the pump 111A and a main pipe 131 leading to the reservoir 111 are provided with a known type of backing-off valve 132 which is not described herein. The backing-off valve 132 ensures that a given constant hydraulic pressure is maintained in the circuit without the need for the pump 111A to be operated constantly. Any desired hydraulic pressure can be obtained by means of the backing-off valve 132.

Referring now to FIGURE 8, it will be seen that the hydraulic cylinders 54 which are provided for the height adjustment of the shoes 51 communicate with a valve 134 identical to the valve 108 and mounted near the driver's seat by way of pipes 133. The valve 134 communicates with the main pipes 131 and 130 by way of pipes 135 and 136 respectively. The valve 134 is controlled by means of a lever 137 which is adapted to co-operate with a sliding rod 138 received within the valve 134.

The lifting cylinders 98 which are provided for raising and lowering the portions 4 of the moving table 3, communicate with a valve 141 by way of pipes 140. The valve 141 is identical to the valve 134 and communicates with the main pipes 131 and 130 by way of pipes 142 and 143 respectively. Each pipe 140 communicates with a reservoir 145 by way of a pipe 144, each reservoir 145 being made of a flexible material and containing a gas bubble 146, preferably nitrogen, which bubble 146 is compressed by the liquid of the hydraulic circuit. The flexible reservoirs 145 containing gas together with the hydraulic circuit in communication therewith thus constitute hydro pneumatic means.

It has already been stated that the reels 39 are upwardly and downwardly adjustable by means of the hydraulic cylinders 41. Each cylinder 41 communicates with a valve 148 by way of a pipe 147, the valve 148 being identical to the valves 134 and 141 and communicating with the main pipes 131 and 130 by way of pipes 149 and 150 respectively. All the valves 134, 141 and 148 are arranged on the combine harvester near the driver's seat.

The various hydraulic members described above and their control members operate as follows. In the position of the lever 114 shown in FIGURE 6 the mowing table 3 occupies a position in which the feeler member 58 is in contact with the ground during operation of the combine harvester. The sliding rod 125 of the valve 119 is so positioned in this case by the cam disc 117 that liquid is unable to flow through the pipes 127 to the lifting cylinders 104.

The sliding rod 121 received in the control valve 120 is held in such a position for the given position of the lever 114 shown in FIGURE 6 that the valve is open. Thus the valve 108 which is coupled with the feeler member 58 communicates with both the main pipes 130 and 131. When the feeler member 58 encounters a bump or other upward unevenness, it is turned upwardly about the pin 59 and hence the sliding rod 107 in the valve 108 is withdrawn therefrom so that the main pipe 130 containing the high pressure liquid comes into communication with the pipes 110 which lead to the lifting cylinders 104, so that the mowing table 3 is raised. When the bump or unevenness has been passed the feeler member 58 turns downwardly about the pin 59 and this in conjunction with the action of the spring 109 allows the main pipe 131 to communicate with the pipes 110 whereby high pressure liquid can flow from the cylinders 104 to the reservoir 111 until the mowing table 3 regains its original position.

When the lever 114 is moved to the left-hand side of the sector plate 116, the sliding rod 121 is displaced by the cam disc 118 so that the control valve 120 is closed and the feeler member 58 cannot control the lifting cylinders 104.

When the lever 114 is moved to the left the sliding rod 125 is displaced by the cam disc 117 so that the main pipe 130 comes into communication with the pipe 127 and thence to the lifting cylinders 104 which thus raise the elevator housing 5 and platform 3.

From FIGURES 6 and 7, it will be seen that the lever 114 may occupy a central position (alongside the element 115), in which the sliding rod 125 is held by the cam disc 117 in such a position that connection between the main pipe 130 and the pipes 127 is interrupted and hence the mowing table 3 remains in a given position. When the lever 114 is moved from its central position (alongside the element 115) either to the left or to the right, the sliding rod 125 in valve 119 is moved in such a position that the main pipe 130 comes into communication with the pipe 127 and the mowing table 3 can be raised. Hereby the mowing table 3 and the elevator housing 5 are moved upwardly by the lifting cylinders 104 by turning about the shaft 7.

The lever 137 controls the valve 134 through the sliding rod 138 in order to displace the lifting cylinders 54 which are coupled with the shoes 51. The valve 141 is controlled by the lever 139 acting through its sliding rod 138A so that liquid can flow to the lifting cylinders 98 and hence the portions 4 of the mowing table 3 can be raised and lowered by means of the arms 99 turning the beams 19 about the pins 14 and 15. When the combine harvester is in normal operation the portions 4 bear on the ground through the shoes 51. The lifting cylinders 98 are in communication with the reservoirs 145 containing the gas bubbles 146 and hence resilient support for the portions 4 is obtained and the pressure of the shoes 51 on the ground is materially reduced and smooth adaptation of the portions 4 to unevennesses in the ground is ensured. The positions of the reels 39 can be adjusted on actuation of the valve 148 by the lever 139A whereby high pressure liquid can flow to or from the lifting cylinders 41 and hence alter the position of the reels 39.

The combine harvester which has been described may be employed in various ways. When it is desired to cut low lying crop, for example, crop which has been blown down by the wind, hail or the like, it is necessary that the mowing beams 44 be moved only a few centimeters above the ground and in this case the locking of the two portions 4 to the frame of the combine harvester can be disengaged by removing the pins 100 so that each portion 4 can pivot about its own axis afforded by the pins 14 and 15 which lie on one side of the elevator housing 5. In this manner the portions 4 can match or adapt themselves to any unevennesses in the ground. The portions 4 of the mowing table engage the ground with their shoes 51. Both the shoes 51 are adjustable in common to the same height by means of the valve 134 and the lifting cylinders 54. The feeler member 58 whch is disposed near the center of the machine near the partition 48 between the two portions 4 can be rendered operative by means of the lever 114. Actuation of the valve 108 by the feeler 58 can then cause liquid to flow to or from the lifting cylinders 104. In addition a slight amount of liquid can be supplied to the lifting cylinders 98 for the portions 4 by means of the valve 141 so that the gas bubbles 146 in the flexible containers 145 have a cushioning effect and the pressure with which each of the portions 4 bears on the ground through the shoes 51 can be considerably reduced and hence the portions 4 thus follow the ground surface more accurately and the mowing mechanism have optimum effect. When the driver of the combine harvester reaches the end of a strip of crop or an edge of the field, the mowing table 3 may be raised by actuation of the lever 114 and hence the lifting cylinders 104, and since the portions 4 are in the unlocked position, the arms 99 will turn relatively to their channel beams 97 until they abut against the plates 101. In this position the portions 4 are inclined downwardly at an angle of about 5° to the horizontal. When it is desired to mow at a distance of about 25 centimeters above the ground, the mowing table 3 is moved to said height by operation of the lifting cylinders 54 and hence lowering of the shoes 51 and the feeler member 58 is held by one of the stops 63. As previously described, the pressure of the shoes on the ground can be reduced by means of the gas cushion effect. The two portions 4 are again in the unlocked state and can thus follow unevennesses in the ground since they are capable of deflecting resiliently about the pins 14 and 15. When it is desired to mow at a height of more than 25 centimeters above the ground, the shoes 51 are also out of contact with the ground and if mowing is performed at 30 centimeters or more above the ground, then the two portions 4 of the mowing table 103 are locked in the horizontal position by means of the locking pins 100 (FIGURE 3). The whole mowing platform comprising the portions 4 thus has its entire weight carried by the driving wheels 2 and the mowing platform 3 comprises a single unit.

When it is desired to move the combine harvester into a transport position, the elevator housing 5 together with the mowing table 3 is raised when the lever 114 is operated, and on removal of the locking pins 100, each of the portions 4 can be turned upwardly about their pins 14 and 15 on actuation of the valve 141 and the lifting cylinders 98. The portions 4 are then substantially vertically disposed.

Thus a combine harvester having a relatively large cutting width, for example, 6 meters, can be readily converted into a transport position in which it can be readily moved from one place to another. In the particular embodiment described it is not necessary to raise the mowing table very much above the ground owing to the particular disposition of the pins 14 and 15. Each pair of pins 14 and 15 is located inwardly of the outward end of its corresponding portion 4 by a distance which is approximately equal to two-thirds of the width of each portion 4. Owing to this disposition of the pins 14 and 15, the portions 4 of the mowing table can readily match or adapt themselves to unevennesses in the ground surface and the portions 4 are effectively supported by means of the triangular frames formed by the beams 19, 20 and 21 so that the portions 4 cannot be displaced in a direction parallel to the longitudinal axis of the combine harvester to any appreciable extent.

From FIGURES 1 and 2 it will be seen that the elevator housing 5 which is of cylindrical shape, is of particularly rugged construction and is effectively supported on all sides so that torsional forces can be readily opposed and absorbed. The partition 48 also serves to strengthen the construction of the elevator housing 5.

The front end of the partition 48 serves as a crop divider so that the stems of the crop are deflected outwardly towards the portions 4 and can be readily engaged by the reels 39 above each mowing beam 44. Also the supporting beams 23 for the cutter bars 44 and the augers 45 are located, during operation, behind the partition 48 so that the beams 23 do not obstruct the delivery of crop to the reels 39 and mowing beams 44. Satisfactory delivery of mown or cut crop to the elevator housing 5 is also ensured by the fact that supporting beams 23 extend obliquely forwardly and hence keep the foremost opening of the elevator housing clear.

Also the gas cushion effect for reducing the weight of the pivotable portions may be substituted by other means, such as, for example, springs.

For the purposes of the invention as claimed the terms "forward" and "rear" are used with reference to the intended direction of operative travel.

In FIGURES 9 and 10 a further embodiment is shown, whereby the mowing table 150 comprises a cutter bar 151, which is supported by means of resilient material 152, preferably rubber. One end of the cutter bar is hingably connected by means of a pivotal shaft 153, whereas the other end is slidably engaged by a support 154. Just as with the construction shown in FIGURES 1–8 the mowing mechanism with the construction shown in the FIGURES 9 and 10 is flexible, downwardly and upwardly transverse of the intended direction of travel in order to match the unevennesses of the ground.

Having thus described my invention, what I claim as new and desire to secure by Letters Patent of the United States is:

1. A combine harvester having a mowing table, which is divided in at least two independent portions, crop outlet means in said table communicating with an elevator housing, means included in said portions for displacing crop towards said outlet means, each of said portions having its own mowing mechanism including a cutter and gathering reel, said portions each being pivoted about a horizontal axis extending in the general direction of travel of said harvester, hydraulic adjusting means including at least one hydraulic cylinder connected to a supporting frame means and said portions for pivoting each of said portions about said axes, including its mowing mechanism and gathering reel, into raised positions with respect to said elevator housing, each of said portions being supported by said frame means, said cylinder extending transverse to the general direction of travel of the harvester, said supporting frame means being located behind said mowing table and being pivotally connected to said elevator housing whereby said portions can be mowed independently of said housing.

2. A harvester as claimed in claim 1, wherein a crop divider is positioned between said portions.

3. A harvester as claimed in claim 1, wherein each of said portions is connected to a hydraulic piston and cylinder of said hydraulic means whereby actuation of said piston turns said portions to adjusted raised positions.

4. A harvester as claimed in claim 1, wherein each portion has a rotatable reel and each includes horizontal blades; a blade of one reel lying between two blades of the other reel, viewed in the direction of the axis of rotation of said reels.

5. A harvester as claimed in claim 1, wherein each of said portions includes an auger extending transverse to the direction of travel of said harvester, each of said augers being supported in its respective portion at substantially the outer side of each of said portions.

6. A harvester as claimed in claim 1, wherein a partition is arranged between said two portions of the mowing table, said partition extending forwardly beyond said mowing table with the forward part of said partition being a crop divider.

7. A harvester as claimed in claim 6, wherein said partition houses drive means for said mowing table.

8. A harvester as claimed in claim 1, wherein each of said portions is pivotable about a further horizontal axis.

9. A harvester as claimed in claim 1, wherein locking is interconnected to the frame of said harvester for locking at least one of said portions in a substantially horizontal position.

10. A harvester as claimed in claim 1, wherein stop means is provided to limit the turning movements of said portions in at least one direction.

11. A harvester as claimed in claim 10 wherein said supporting frame means is connected to said stop means.

12. A harvester as claimed in claim 11, wherein said stop means comprises an arm, said supporting frame means being connected to said arm, locking means on said harvester for fixing said arm in at least two different positions relative to said frame means.

13. A harvester as claimed in claim 1, wherein said hydraulic means includes a hydraulic circuit for supporting said portions and hydropneumatic cushion means is included in said circuit whereby each of said portions is resiliently supported as the harvester travels over the ground.

14. A harvester as claimed in claim 13, wherein said hydropneumatic means comprises a container with gas therein in communication with said hydraulic circuit.

15. A harvester as claimed in claim 13, wherein said hydraulic circuit includes a lifting cylinder for each of said portions.

16. A harvester as claimed in claim 1 wherein drive means is provided for each of said portions, said drive means including a driving shaft extending transverse to the direction of travel.

17. A harvester as claimed in claim 1, wherein a feeler member is provided in each of said portions, the feeler members being hydraulically associated with a mechanism for raising and lowering said portions responsive to the underlying ground.

18. A harvester as claimed in claim 17, wherein said feeler members are pivotably mounted on said portions to extend to the rearward from pivotable mountings.

19. A harvester as claimed in claim 17, wherein each of said portions is connected to a lifting cylinder in said hydraulic means, said portions being displaceable vertically when said feeler members are moved over uneven ground.

20. A harvester as claimed in claim 17, wherein said hydraulic means is included in a circuit having a regulating mechanism which includes actuating means to render said feeler member operably ineffective, said regulating mechanism including further regulating means whereby when said feeler member is rendered ineffective, the hight of the mowing table relative to the ground can be selectively varied.

References Cited
UNITED STATES PATENTS

| 1,073,819 | 9/1913 | Rice | 56—21 |
| 2,262,906 | 11/1941 | Raney et al | 56—125 |
| 1,724,300 | 8/1929 | Moncreiffe | 56—21 |
| 2,452,153 | 10/1948 | Ronning et al. | 56—20 XR |
| 2,750,727 | 6/1956 | Wright | 56—208 |
| 3,258,901 | 7/1966 | Vanderlely et al | 56—20 |

ANTONIO F. GUIDA, Primary Examiner

U.S. Cl. X.R.

56—2, 228